United States Patent [19]
Cribbins

[11] 3,778,761
[45] Dec. 11, 1973

[54] VEHICLE ORIENTATION DETERMINATION

[75] Inventor: Alan H. Cribbins, Derby, England

[73] Assignee: British Railways Board, London, England

[22] Filed: Feb. 10, 1972

[21] Appl. No.: 225,046

[30] Foreign Application Priority Data
Feb. 25, 1971  Great Britain..................5442/71

[52] U.S. Cl................ 340/39, 246/63 C, 324/41 R
[51] Int. Cl............................................ G08g 1/01
[58] Field of Search..................... 340/22, 31 R, 32, 340/33, 38 R, 38 L, 39, 258 R, 258 B, 258 C; 246/63 C, 8; 324/41 R, 84, 165, 175, 179; 179/1 VE, 82

[56] References Cited
UNITED STATES PATENTS
3,696,882  10/1972  Martin..................................340/32
3,636,508  1/1972  Ogilvy et al..........................179/82
3,126,522  3/1964  Fieser..................................340/39
2,243,341  5/1941  Horni...................................340/39

Primary Examiner—William C. Cooper
Assistant Examiner—Randall P. Myers
Attorney—Elliott I. Pollock et al.

[57] ABSTRACT

This invention relates to a device for determining the orientation of a vehicle so that this information can be used to correlate automatic vehicle control equipment to signalling information being received by the vehicle. The device operates by determining the direction of power flow in a terminated conductor loop laid in the path of the vehicle by effectively obtaining the vector product of the magnetic and electric fields associated with the power flow.

3 Claims, 2 Drawing Figures

VEHICLE ORIENTATION DETERMINATION

The present invention relates to a device whereby the orientation of a vehicle may be determined with the vehicle at rest or in motion.

A problem arising from the application to railway signalling of remote automatic control techniques has been that of determining the orientation of the train upon the track, so that its actual or intended direction of motion may be correlated with the signalling information. A method of solving this problem is proposed which requires no modification to existing track conductor configurations, and requires only simple additional train-borne equipment.

According to the present invention there is provided a device for determining the orientation of a vehicle comprising a terminated conductor loop arranged in the path of the vehicle along its direction of travel and including means for feeding power into one end of said loop, means carried by said vehicle for detecting the direction of the magnetic and electric field associated with the power flow in said conductor loop, and means for obtaining the vector product of said magnetic and electric fields and hence the direction of the power flow in said conductor loop.

A preferred embodiment of the present invention will now be described with reference to the accompanying drawings in which.

Figure 1:
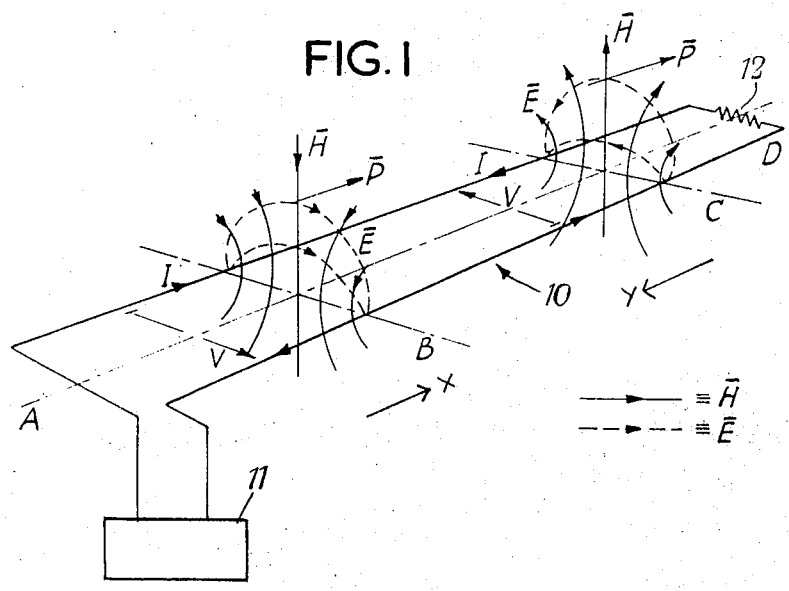
FIG. 1 is a diagrammatic view of a conductor loop illustrating the direction of the magnetic and electric fields associated with the loop.

The direction of power flow in a electrogmagnetic transmission line is uniquely determined by the phase relationship between the instantaneous direction of current flow in the line and the instantaneous voltage between its conductors. FIG. 1 represents a two-wire transmission line 10, situated between the rails of a railway track with power flowing from a generator 11 at end A to a terminating load 12 at D. On a given stretch of railway track the relative position of the generator 11 and the line 10 is constant with respect to the direction of signalling. Instantaneous line current I and voltages V, and their associated electric and magnetic fields, $\overline{E}$ and $\overline{H}$, are drawn at points B and C, which are one half-wavelength apart. As is known, the vector product of the two vector quantities, in this case the electric field $\overline{E}$ and the magnetic field $\overline{H}$, has a direction which can be determined by the so-called "right hand rule." In the particular case in question in which the vector product of an electric and a magnetic field is being considered, the resultant product is known as Poynting's vector. The spatial orientation of the Poynting vector indicates the direction of power flow. The method proposed effectively determines $\overline{P}$.

Figure 2:
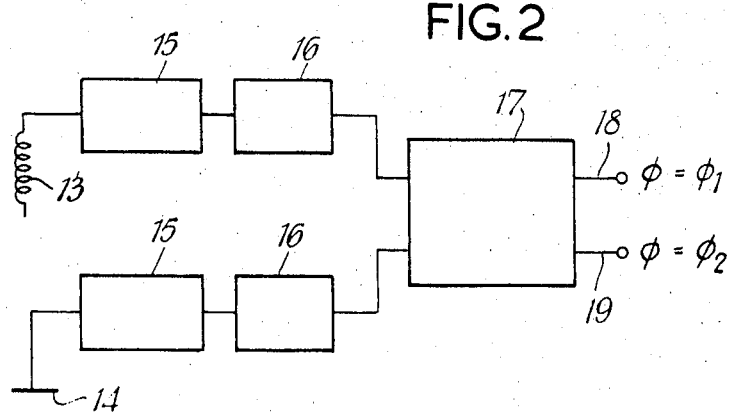
FIG. 2 is a circuit diagram of a detector circuit carried by the vehicle.

The elements of the proposed system are illustrated in FIG. 2. A vertical magnetic field pick-up coil 13 carried by a railway vehicle is used to sense the direction of magnetic field, and an additional capacitive pick-up 14 is used to sense the direction of the electric field. The signals from the two pick-ups 13 and 14 are then processed by being passed through an amplifier 15 and a filter 16 and then to a phase comparison device 17 which is of known design and which determines the direction of the power flow in the transmission line 10 by comparing the phases of the two signals.

In an ideal situation, the electric and magnetic fields associated with the signal fed from the generator into the line 10, will be in phase. In practice however, differences of phase inevitably occur between the two fields.

As can be seen from FIG. 1, in the illustrated arrangement of the transmission line 10, at any point above the center line of the loop the magnetic field vector $\overline{H}$ is substantially vertical, whereas the electric field vector $\overline{E}$ is substantially horizontal. Consider a vehicle positioned over the transmission line, either stationary or in motion in either direction, with its driving end facing in the direction of the arrow X. The fields sensed by the pick-ups 13 and 14 would alternate at the signal frequency between magnetic acting vertically downwards with electric acting from left to right, and magnetic acting vertically upwards with electric acting from right to left. In this situation, when the vehicle is facing in the direction of arrow X the convention is adopted that the phase difference $\phi_1$ between the signals from the two pick-ups 13 and 14 will be $\phi_1 = \phi_o$ where $|\phi_o| < 90°$.

If the vehicle were to be turned, so that the driving end, referred to above, faces in the direction Y the fields sensed by the pick-ups 13 and 14 would alternate between magnetic acting vertically downwards with electric acting from right to left, and magnetic acting vertically upwards with electric acting from left to right. In the latter case the relative phase of the resulting signals from the two pick-ups would be $\phi_2 = \phi_o + \pi$.

If it is assumed that the properties of the two pick-ups are such that the relative phase of their respective output signals corresponds exactly to the relative phase of $\overline{E}$ and $\overline{H}$, then the information $-90° < \phi < +90°$ would indicate that the Poynting Vector $\overline{P}$ points in the direction opposite to that in which the vehicle is facing, and therefore that the vehicle is facing the transmitting end A of the transmission line. Conversely, the information $\pi - 90° \leq \phi < +90°$ would indicate that the Poynting Vector $\overline{P}$ points in the same direction that the vehicle is facing, and therefore that the vehicle is facing the termination end D of the transmission line.

Signals with relative phases close to the ambiguous values of $\pm 90°$ (which would be produced by a highly reactive transmission line, i.e., one which is open-circuited or short-circuited at the termination end) are open to misinterpretation due to relatively small phase errors in the measuring system. For this reason, signals with relative phases approaching $\pm 90°$ are not accepted for orientation determination. As a reasonable compromise between avoiding this region of ambiguity while allowing adequate margins for transmission line and detecting system imperfections, the phase comparison device 17 is arranged to give a signal at output 18 only when the relative phase of the received signals is $\phi_1$, defined by $-45° < \phi_1 < +45°$, and is arranged to give a signal at output 19 when the relative phase of the received signals is $\phi_2$ defined by $\pi - 45° < \phi_2 < \pi + 45°$. A signal at output 18 therefore indicates that the vehicle is facing in direction X, and a signal at output 19 indicates that the vehicle is facing in direction Y.

I claim:

1. A device for determining the orientation of a vehicle moving along a fixed trackway comprising a terminated conductor loop arranged in and along the path of the vehicle and including means for feeding power into one end of said loop, means carried by said vehicle for separately detecting the direction of the magnetic and electric field associated with the power flow in said conductor loop, and means for feeding the signals from said detecting means as inputs to a calculating means, said calculating means including means responsive to said input signals for producing one of two possible output signals which correspond respectively to the different possible spatial orientation of the vector product of the said magnetic and electric fields, thereby to indicate the orientation of said vehicle on said trackway.

2. The device of claim 1 wherein said calculating means comprises a phase comparison device in which the phase of the said magnetic field and the phase of said electric field are compared.

3. A device as claimed in claim 1, wherein the means for detecting the direction of the said magnetic field includes a coil arranged with its longitudinal axis substantially vertical.

* * * * *